(12) United States Patent
Mohrlock et al.

(10) Patent No.: US 9,393,848 B2
(45) Date of Patent: Jul. 19, 2016

(54) TORSION SPRING SYSTEM FOR A WHEEL SUSPENSION OF A MOTOR VEHICLE

(71) Applicant: AUDI AG, Ingolstadt (DE)

(72) Inventors: Dominik Mohrlock, Buxheim (DE); Andreas Schindler, Ingolstadt (DE); Heinrich Beringer, Denkendorf (DE); Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/768,025

(22) PCT Filed: Jan. 16, 2014

(86) PCT No.: PCT/EP2014/000103
§ 371 (c)(1),
(2) Date: Aug. 14, 2015

(87) PCT Pub. No.: WO2014/124722
PCT Pub. Date: Aug. 21, 2014

(65) Prior Publication Data
US 2016/0001620 A1    Jan. 7, 2016

(30) Foreign Application Priority Data

Feb. 16, 2013    (DE) .......................... 10 2013 002 714

(51) Int. Cl.
*B60G 11/50*    (2006.01)
*B60G 11/48*    (2006.01)
*B60G 11/60*    (2006.01)
(Continued)

(52) U.S. Cl.
CPC ............... *B60G 11/50* (2013.01); *B60G 11/48* (2013.01); *B60G 11/60* (2013.01); *B60G 21/0553* (2013.01); *B60G 21/0555* (2013.01); *F16D 3/10* (2013.01); *F16D 3/12* (2013.01); *B60G 2200/10* (2013.01); *B60G 2202/10* (2013.01); *B60G 2202/135* (2013.01); *B60G 2202/22* (2013.01); *B60G 2202/23* (2013.01); *B60G 2202/32* (2013.01); *B60G 2204/42* (2013.01);
(Continued)

(58) Field of Classification Search
CPC combination set(s) only.
See application file for complete search history.

(56) References Cited

U.S. PATENT DOCUMENTS 5,288,101 A * 2/1994 Minnett ............... B60G 17/015
267/277
7,241,224 B2 * 7/2007 Song ........................ F16D 3/12
192/212

(Continued)

FOREIGN PATENT DOCUMENTS

| DE | 649 020 | 8/1937 |
|---|---|---|
| DE | 102 33 499 | 1/2004 |

(Continued)

OTHER PUBLICATIONS

International Search Report issued by the European Patent Office in International Application PCT/EP2014/000103 on Mar. 28, 2014.

*Primary Examiner* — Nicole Verley
(74) *Attorney, Agent, or Firm* — Henry M. Feiereisen LLC

(57) ABSTRACT

A torsion spring system for a wheel suspension of a motor vehicle includes an actuator that is provided on the vehicle body and variably maintains the torsion spring system under tension, and which acts, via a torsion bar and an output lever, with a biasing force on a wheel suspension element of the wheel suspension. The torsion bar is configured in two parts between the actuator and the output lever and has a first bar part and a second bar part coupled thereto with a spring element connected in between the first and second bar parts.

9 Claims, 5 Drawing Sheets

(51) Int. Cl.
*B60G 21/055* (2006.01)
*F16D 3/10* (2006.01)
*F16D 3/12* (2006.01)

(52) U.S. Cl.
CPC ... *B60G2204/421* (2013.01); *B60G 2204/4232* (2013.01); *B60G 2500/20* (2013.01)

(56) References Cited

U.S. PATENT DOCUMENTS

| | | | | |
|---|---|---|---|---|
| 7,896,360 | B2 * | 3/2011 | Buma | B60G 17/0161 280/5.502 |
| 8,240,679 | B2 * | 8/2012 | Kajino | B60G 17/0157 280/5.515 |
| 8,490,983 | B2 | 7/2013 | Schmid et al. | |
| 8,562,009 | B2 * | 10/2013 | Michel | B60G 11/44 280/124.137 |
| 8,690,174 | B2 * | 4/2014 | Grau | B60G 21/0555 280/124.103 |
| 8,746,713 | B2 * | 6/2014 | Meitinger | B60G 3/20 280/86.751 |
| 8,827,287 | B2 * | 9/2014 | Michel | B60G 11/183 280/124.106 |
| 8,967,670 | B2 | 3/2015 | Mohrlock et al. | |
| 9,108,482 | B2 * | 8/2015 | Mohrlock | B60G 17/025 |
| 9,243,670 | B2 * | 1/2016 | Nakagaito | F16F 15/1395 |
| 2007/0108707 | A1 * | 5/2007 | Kobayashi | B60G 17/0162 280/5.511 |
| 2007/0170681 | A1 | 7/2007 | Nelson et al. | |
| 2009/0008887 | A1 | 1/2009 | Buma | |
| 2012/0149511 | A1 * | 6/2012 | Hodjat | F16D 3/10 474/94 |
| 2012/0306174 | A1 | 12/2012 | Schmid et al. | |
| 2013/0099455 | A1 | 4/2013 | Beringer et al. | |
| 2014/0046502 | A1 | 2/2014 | Schmitt | |
| 2014/0217782 | A1 | 8/2014 | Mohrlock et al. | |
| 2014/0291098 | A1 * | 10/2014 | Saiga | F16D 3/12 192/3.28 |

FOREIGN PATENT DOCUMENTS

| | | | | |
|---|---|---|---|---|
| DE | 102009005899 | | 7/2010 | |
| DE | 102009047123 | | 5/2011 | |
| DE | 102009047128 | | 5/2011 | |
| DE | 102009054675 | | 6/2011 | |
| DE | 102011080055 | | 1/2013 | |
| DE | 102014212433 | A1 * | 12/2015 | ......... B60G 17/0162 |
| EP | 1 270 285 | | 1/2003 | |
| EP | 1 275 535 | | 1/2003 | |
| EP | 1 785 294 | | 5/2007 | |
| EP | 2 011 674 | | 1/2009 | |
| EP | 2 213 489 | | 8/2010 | |
| EP | 2 508 368 | | 10/2012 | |
| FR | 2 874 860 | | 3/2006 | |
| GB | 2 021 053 | | 11/1979 | |
| WO | WO 03/068541 | | 8/2003 | |

* cited by examiner

TORSION SPRING SYSTEM FOR A WHEEL SUSPENSION OF A MOTOR VEHICLE

CROSS-REFERENCES TO RELATED APPLICATIONS

This application is the U.S. National Stage of International Application No. PCT/EP2014/000103,filed Jan. 16, 2014, which designated the United States and has been published as International Publication No. WO 2014/124722and which claims the priority of German Patent Application, Ser. No. 10 2013 002 714.4,filed Feb. 16, 2013,pursuant to 35 U.S.C. 119(a)-(d).

BACKGROUND OF THE INVENTION

The present invention relates to a torsion spring system for a wheel suspension of a motor vehicle.

An example of such a suspension assembly is known from DE 10 2009 005 899A1. The suspension assembly includes a torsion spring bar which is actuatable by an actuator and extending in the vehicle transverse direction to about the vehicle transverse center and which on the wheel side acts on a driven lever that, in turn, is articulated to a wheel suspension element of the wheel suspension. The torsion spring bar is configured in the DE 10 2009 005 899A1 of several parts and in an interlaced arrangement in which two radially outer hollow bars and a radially inner solid bar are provided from spring steel, which are connected to one another in a force-transmitting manner via splines, for example.

In the torsion spring bar system known from DE 10 2009 005 899 A1, spring work is picked up and released during interplay of a wheel compression and wheel rebound motion. At the same time, it is possible that the actuator superimposes moments, i.e., to tighten or relax the torsion spring bars depending on need. The presence of the support spring as a primary spring, renders it possible for the rotary actuator to proportionally provide actuating forces to change the wheel load. A superimposition of the spring forces of the primary spring and the torsion spring bar continuously takes place, depending on the requirement of the driving situation and the corresponding command from the control. At the output of the torsion spring bar system is a rocker having an end to which a coupler is articulated. The coupler connects the rocker to the trapezoidal link, which is connected to the vehicle wheel. Thus, the torques generated in the rotary actuator can be transmitted via the load path motor/gear/torsion spring bar/rocker/coupler/trapezoidal link/vehicle wheel ultimately as linear actuating forces upon the vehicle wheel.

In the afore-described torsion spring bar system, the torsion spring bar is comprised of only two components, namely tube spring and solid bar spring. In contrast thereto, the remaining components are dimensioned absolutely rigid in the afore-mentioned load path without affecting the overall spring constant of the system. If there is need for example for realization of a softer torsion spring bar, as first measure the diameter of tube spring and/or solid bar spring would have to be reduced. However, by reducing the diameter, the operational capability of the torsion spring bar would decrease and at the same time stress would increase disproportionately, so that the tube spring and bar spring would have to be extended. Such a change in length is, however, not feasible in view of the extremely critical space conditions in the area of the wheel suspension. As a consequence, especially when smaller vehicle models are involved, which require a reduction in the total spring stiffness, such a rotary actuator cannot be installed because of the high packing tightness.

EP 2 01 1674 A1 discloses a two-part stabilizer for a motor vehicle, having stabilizer sections which are able to execute a rotational relative movement and to apply in the presence of a twisting load in opposite directions a restoring force which is adjustable by an actuator in conjunction with a gear. A torsion damper is provided in the gear. With the assistance of the torsion damper, gear noise can be avoided that otherwise would develop as a result of a tooth gap between the gear elements. The torsion damper reduces such mechanical noise within the gear, with the torsion damper being dimensioned such that the spring rate of the stabilizer assembly remains unaffected. This means that the spring rate of the stabilizer assembly is not lowered by the torsion damper,

SUMMARY OF THE INVENTION

The object of the invention is to propose a suspension assembly of the generic type, which enables additional influence of the spring rate of the torsion spring bars in a structurally and constructively simple manner.

The solution of this object is set forth by a torsion spring system for a wheel suspension of a motor vehicle, including an actuator which variably maintains the torsion spring system under tension and is arranged on the vehicle body and which acts on a wheel suspension element of the wheel suspension with a biasing force via a torsion bar and an output lever, wherein the torsion bar is configured between the actuator and the output lever in two parts with a first bar part and a second bar part coupled thereto, with interposition of a spring element.

Advantageous and particularly appropriate configurations of the invention are set forth in the dependent claims.

In accordance with the present invention, the torsion bar is not formed from same material and/or in one piece between the actuator and the output lever, but rather of two parts with a first bar part and a second bar part coupled thereto. A spring element is placed between the first and second bar parts. In this way, there is no longer any need for the torsion bar to be provided with a predefined sufficiently large torsion length to lower the spring rate to a predefined value. Rather, the spring rate is defined solely by the interposed spring element. The torsion motion is therefore provided in a space-efficient manner by the spring element interposed between the first and second bar parts of the torsion bar.

Preferably, the first bar part and the second bar part are arranged for rotation relative to each other from an initial position by a free movement range about a torsion angle. The rotation movement from the initial position is realized while building up a restoring force of the spring element.

The first bar part and the second bar part may, preferably, be arranged in coaxial relationship and/or between the actuator and the output lever behind one another in series. Correspondingly, the coupling point of both bar parts is arranged between the output lever and the actuator.

In one embodiment, the first bar part and the second bar part have at the coupling point support elements, which overlap each other in the axial direction. The at least one spring element may be arranged between the support elements of the first and second bar parts which support elements are nested within one another in the axial direction.

In a further embodiment, the first bar part and the second bar part can be coupled with one another at the coupling point via a ball-ramp system. The ball-ramp system includes ramp-like guideways respectively extending in circumferential direction on the first bar part and the second bar part and at an incline to a rotation plane. Balls are provided between the guideways of the first and second bar parts to respectively roll thereon. The two bar parts can be moved apart by an axial stroke as they are rotated relative to one another. The axial stroke is established while the spring element builds up a restoring force.

The particular advantage of the invention resides, compared to the prior art, in a much simpler construction of the motor-gear unit of the actuator in conjunction with a simplified design of the torsion spring bar that can be configured especially shorter. The required spring travel and the spring stiffness or spring rate is determined by the spring element arranged between the two bar parts.

In order to achieve a structurally simple construction, it is advantageous when the first bar part and/or the second bar part are configured as solid bars. The actuator may, preferably, be supported with its housing rigidly and/or in fixed rotative engagement on the vehicle body.

According to a particularly preferred arrangement on an axle of the motor vehicle, two torsion spring systems are provided which are aligned transversely to the vehicle longitudinal direction, with their motor-gear units of the actuators being rotatably supported in the area of the vertical vehicle longitudinal center plane. The torsion bars with the output levers can be positioned relative thereto on the outside.

The advantageous configurations and/or refinements of the invention, as described above and set forth in the dependent claims, can—except for example in the cases of clear dependencies or incompatible alternatives—be used individually or also in any combination with each other.

BRIEF DESCRIPTION OF THE DRAWING

The invention and its advantageous configurations and refinements and their advantages are explained in more detail with reference to drawings.

It is shown in.

DETAILED DESCRIPTION OF PREFERRED EMBODIMENTS

Figure 1:
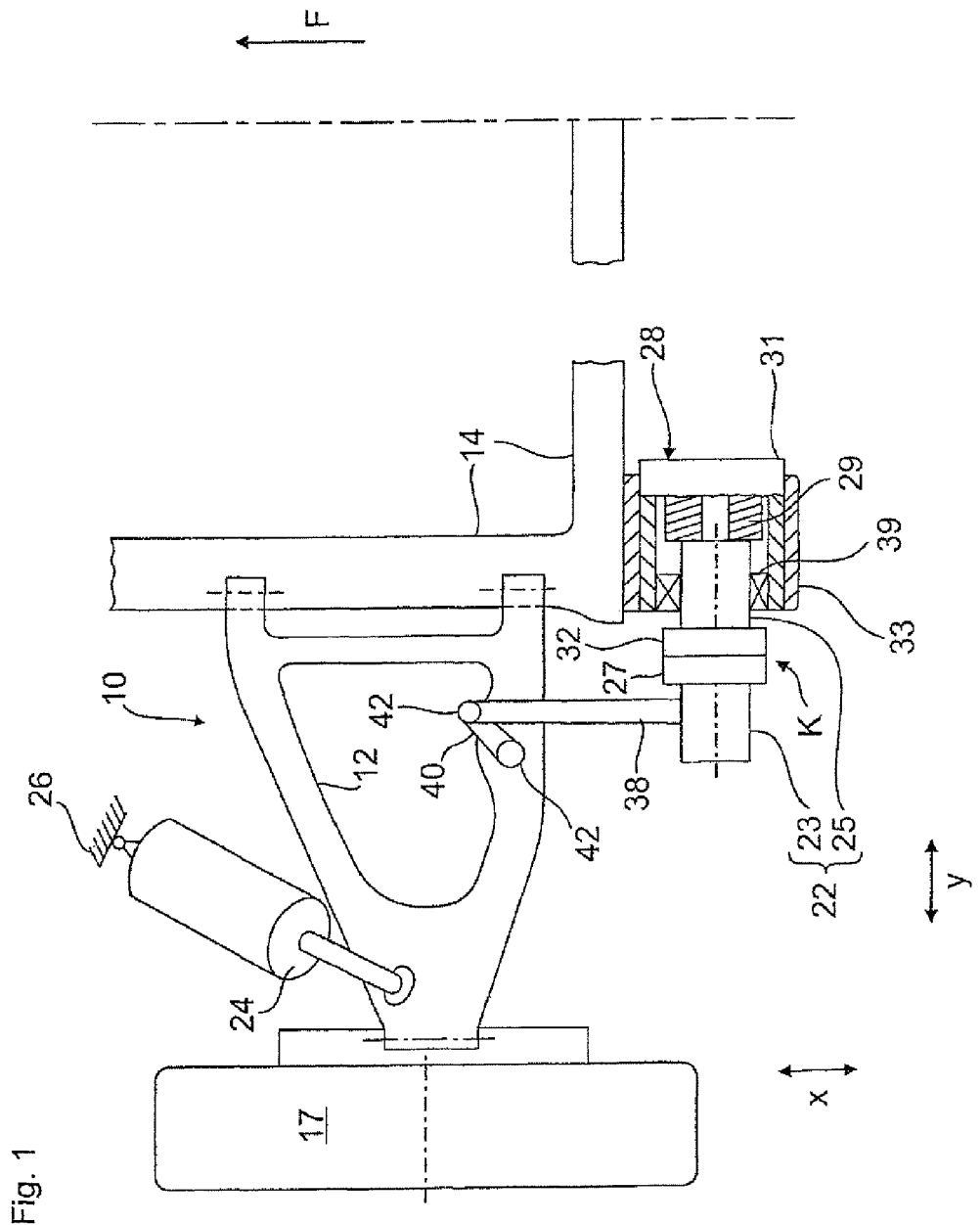
FIG. 1 a plan view upon the lower plane of a left-side wheel suspension of a rear axle of a motor vehicle, with a lower transverse link, a shock absorber, and a torsion spring bar system.

In FIG. 1, 10 designates the lower plane of a left-hand side wheel suspension for a motor vehicle, including a lower transverse link 12 which is articulated on one hand to an only partially illustrated subframe 14 and on the other hand to a not shown wheel carrier for a rear wheel 17. The upper transverse link or control arm, guiding the wheel carrier, is not visible.

Figure 2:
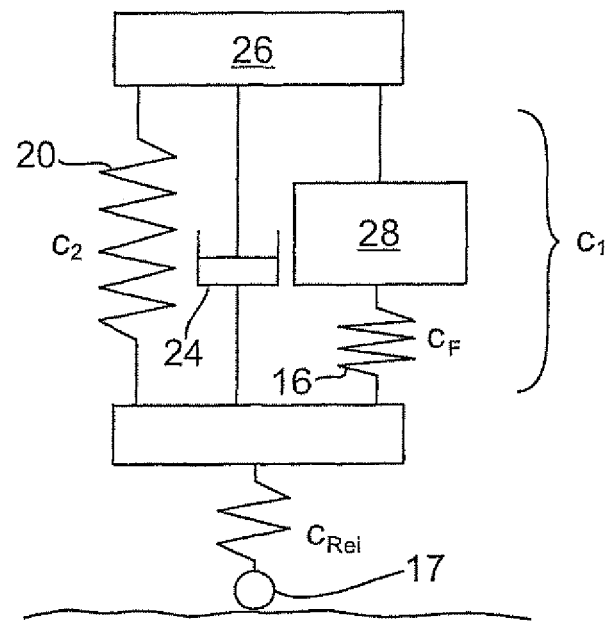
FIG. 2 an equivalent diagram of the suspension assembly according to FIG. 1 with illustration of individual spring rates $c_1$ and $c_2$, which substantially determine an overall spring rate.

The wheel suspension shown in FIG. 1 on the left-hand side has a shock absorber 24 and a separate support spring 20 (only indicated in FIG. 2). The suspension assembly according to the invention is comprised according to FIG. 1 of a torsion spring bar 22, extending in the vehicle transverse direction y, as a storage spring of a construction still to be described.

The shock absorber 24 is supported on the lower transverse link 12 and in a manner not shown at the top to the body 26 of the motor vehicle on which also the subframe 14 is mounted via vibration-isolating bearings.

The torsion spring bar 22 is shown in FIG. 1 formed in two parts comprised of a first bar part 23 and a second bar part 25. The bar parts 23, 25 are made of solid material and joined to one another at a coupling point K. The coupling point K is comprised of a first primary part 27 of greater diameter, which is connected in fixed rotative engagement to the first bar part 23, and a secondary part 32, which is connected in fixed rotative engagement to the second bar part 25. A spring element 16 is connected between the primary part 27 and secondary part 32, as will be described further below. The torsion spring bar 22 extends, as shown in FIG. 1, from a cylindrical actuator 28, mounted to the subframe 14, axially toward the vehicle outer side.

The housing 31 of the actuator 28 is supported rigidly and/or in fixed rotative engagement at a bearing point 33 (FIG. 1) to a vehicle-body-side subframe 14.

The second bar part 25 of the torsion spring bar 22 is extended at a bearing point 39 out of the actuator 28, whereas the first bar part 23 has an outer end which carries an output lever 38 which projects forward in radial relation to the transverse link 12 in the travel direction F of the vehicle and which is hinged via bearing points 42 and a substantially vertically oriented connecting rod 40 to the transverse link 12.

The actuator 28 is a motor-gear unit, which is composed of a powering electric motor and a high ratio gear (for example, a harmonic drive or a cycloidal drive), indicated only roughly with reference numeral 29, with the output member of the gear being in driving relationship with the second bar part 25 of the torsion spring bar 22. The overall spring rate $c_F$ (FIG. 2) of the torsion spring bar 22 is determined solely by the spring rate of the spring element 16, but not by the rigid bar parts 23, 25 and the other components which are arranged in the force path between the actuator 28 and the wheel suspension element 12.

Figure 3:
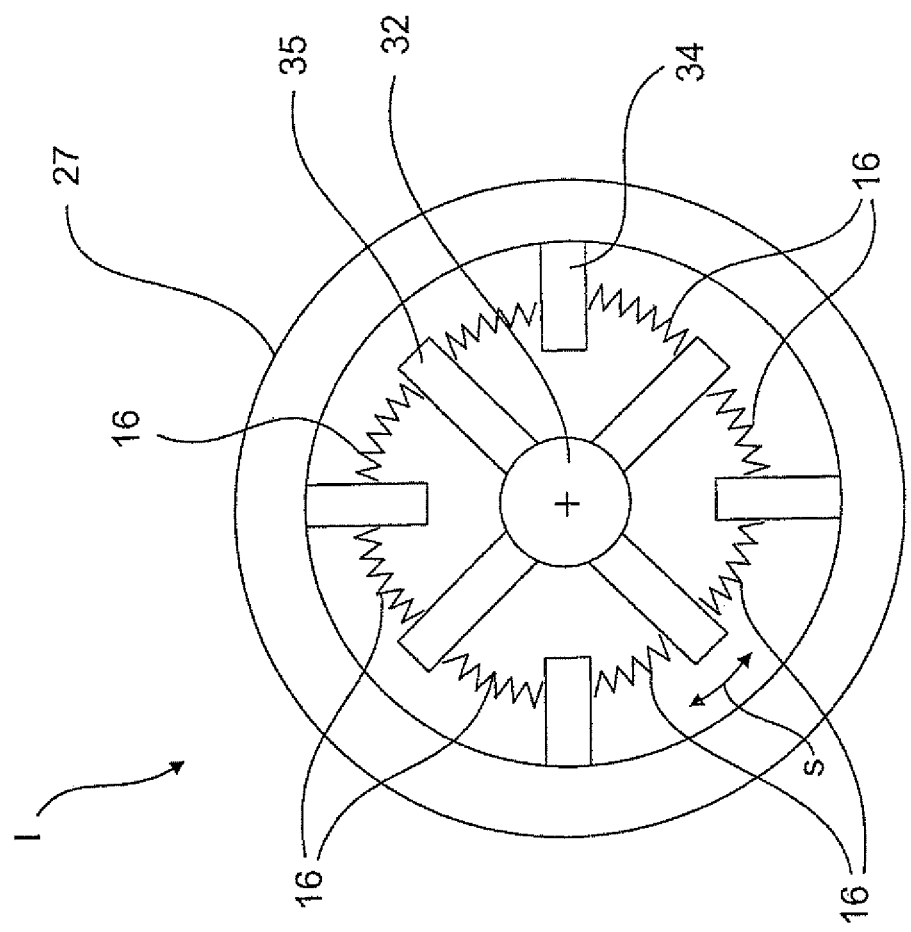
FIG. 3 an enlarged sectional view of the coupling point between the two bar parts of the torsion spring bar.

FIG. 3 shows the primary part 27 of the first bar part 23. The primary part 27 of the bar part 23 is configured as a hollow cylinder with support elements 34 which project inwards in radial direction and are dispersed about the circumference of the inner wall of the primary part 27. Support elements 35 of the secondary part 32 are directed in a star shape outwards and project between the support elements 34 of the primary part 27, so that the support elements 34, 35 of the primary and secondary parts 27, 32 overlap in axial direction.

FIG. 3 shows the support elements 34, 35 of the first bar part 23 and the second bar part 25 in an initial position I. Starting from the initial position I, the two bar parts 23, 25 can be rotated in opposition to one another in circumferential direction by a free movement range s, i.e. about a predefined torsion angle. Such a rotation is accompanied by a buildup of a restoring force of the spring element 16. In FIG. 3, the spring element 16 has a plurality of helical compression springs which are respectively arranged between the support elements 34, 35 of the primary and secondary parts 27, 32.

Figure 4:
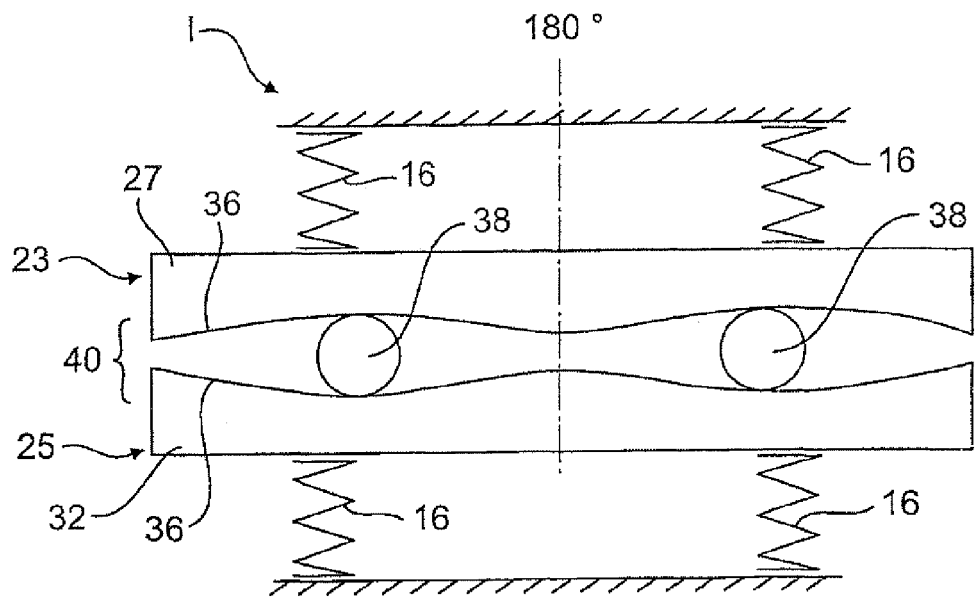
FIG. 4 a planar illustration of the primary part of the first bar part and the secondary part of the second bar part of a torsion spring bar system according to a further exemplary embodiment, with the primary and secondary parts assuming a rest position.
Figure 5:
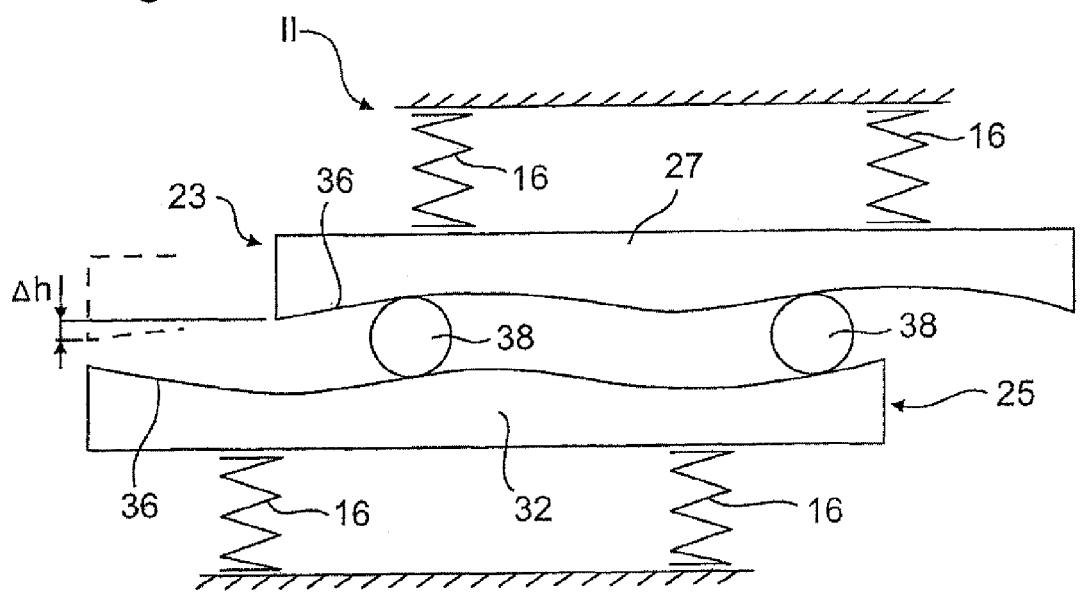
FIG. 5 a view corresponding to FIG. 4, in which the primary and secondary parts are rotated from the rest position to a tightened state.
Figure 6:
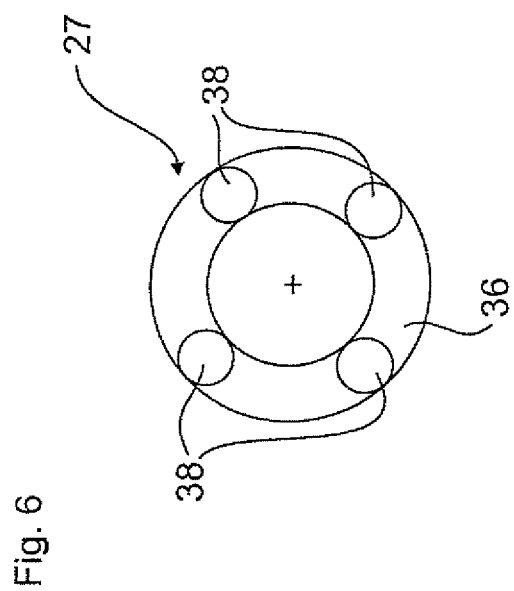
FIG. 6 a plan view of the guideway of the primary part of the first bar part of the torsion spring bar system.

FIGS. 4 to 6 merely roughly indicate a further exemplary embodiment of the invention. Accordingly, the primary part 27 of the first bar part 23 is coupled in FIG. 4 via a ball-ramp system 40 to the secondary part 32 of the second bar part 25. The ball-ramp system 40 illustrated in FIG. 4 in a rest position I is shown for sake of clarity by way of a planar view.

Provision is made for guideways 36 at the confronting sides of the primary and secondary parts 27, 32, as indicated in FIGS. 4 to 6. The guideways 36 extend undulated in circumferential direction, i.e. with axially projecting wave peaks and intermediate recessed valleys. Balls 38 respectively run there along between the guideways 36 of the primary part 27 and the secondary part 32.

As the two bar parts 23, 25 are rotated in opposite directions, the balls 38 roll on the flanks of the undulated guideways 36. Both bar parts 23, 25 are thereby moved apart from the rest position I (FIG. 4) by an axial stroke Δh to a tightened state II (FIG. 5), accompanied by a buildup of a restoring force which is effected by the spring element 16. The spring element 16 is formed, according to FIGS. 4 and 5, by two helical springs, with which the primary part 27 and the secondary part 32 are pressed against each other.

FIG. 2 shows, by way of an equivalent diagram, the interaction of the spring assembly of a wheel suspension 10, using the same reference signs.

As is apparent, the parallel spring systems $c_2$ (support spring 20) and $c_1$ (the spring element 16 of the torsion spring bar 22) are effective between the body 26 of the motor vehicle and the wheel 17 or transverse link 12 and determine the overall spring rate (for sake of completeness, also the spring rate $c_{Rei}$ of the wheel 17 or tire thereof is identified).

As a result of the spring element 16, the spring rate $c_1$, controlled by the actuator 28 as a storage spring and thus the associated overall spring rate $c_{total}$ ($c_1+c_2$) can be reduced or advantageously suited to structural conditions at hand.

The invention claimed is:

1. A torsion spring system for a wheel suspension of a motor vehicle, comprising:
   a torsion bar configured in two parts defined by a first bar part and a second bar part which is coupled to the first bar part;
   a spring element arranged between the first and second bar parts;
   an output lever; and
   an actuator variably maintaining the torsion spring system under tension and arranged on a vehicle body, said actuator being configured to act on a wheel suspension element of the wheel suspension with a biasing force via the torsion bar and the output lever, said torsion bar being arranged between the actuator and the output lever.

2. The torsion spring system of claim 1, wherein the first bar part and the second bar part are rotatable from an initial position relative to each other by a free movement range about a torsion angle, while the spring element builds up a restoring force.

3. The torsion spring system of claim 1, wherein the first bar part and the second bar part are arranged in coaxial relationship and/or between the actuator and the output lever behind one another in series.

4. The torsion spring system of claim 1, wherein the first bar part and the second bar part include support elements which overlap in an axial direction, said spring element being arranged between the support elements of the first and second bar parts.

5. The torsion spring system of claim 1, further comprising a ball-ramp system to couple the first bar part and the second bar part with one another, said ball-ramp system including ramp-like or undulating guideways which are provided on the first bar part and on the second bar part and extend in a circumferential direction and on which balls run along, said first and second bar parts being movable apart in relation to one another by an axial stroke, when rotated in opposite directions, while the restoring force is being built up by the spring element.

6. The torsion spring system of claim 1, wherein the first bar part and/or the second bar part are made from solid material.

7. The torsion spring system of claim 1, wherein the actuator has a housing supported rigidly and/or in fixed rotative engagement at a bearing point on the vehicle body.

8. The torsion spring system of claim 1, wherein the housing of the actuator is supported on a subframe of the vehicle body.

9. The torsion spring system of claim 1 in combination with a further said torsion spring system, said torsion spring systems being provided on an axle of the motor vehicle and oriented transversely to a vehicle longitudinal direction, said actuators of the torsion spring systems being supported rigidly or in fixed rotative engagement in an area of a vertical vehicle center plane.

* * * * *